United States Patent
Kitamura et al.

(10) Patent No.: US 7,558,930 B2
(45) Date of Patent: Jul. 7, 2009

(54) WRITE PROTECTION IN A STORAGE SYSTEM ALLOWING BOTH FILE-LEVEL ACCESS AND VOLUME-LEVEL ACCESS

(75) Inventors: Manabu Kitamura, Cupertino, CA (US); David Brandman, Prescott, AR (US)

(73) Assignees: Hitachi, Ltd., Tokyo (JP); Hitachi Data Systems Corporation, Santa Clara, CA (US)

( * ) Notice: Subject to any disclaimer, the term of this patent is extended or adjusted under 35 U.S.C. 154(b) by 266 days.

(21) Appl. No.: 11/188,006

(22) Filed: Jul. 25, 2005

(65) Prior Publication Data

US 2007/0022259 A1    Jan. 25, 2007

(51) Int. Cl.
*G06F 12/00* (2006.01)
*G06F 13/00* (2006.01)
*G06F 13/28* (2006.01)

(52) U.S. Cl. ...................... 711/163; 711/152
(58) Field of Classification Search ................ 711/163, 711/152
See application file for complete search history.

(56) References Cited

U.S. PATENT DOCUMENTS

| 6,041,394 | A | 3/2000 | Halligan et al. |
| 6,779,083 | B2 | 8/2004 | Ito et al. |
| 7,155,460 | B2 * | 12/2006 | McGovern et al. .......... 707/200 |
| 2004/0030822 | A1 * | 2/2004 | Rajan et al. .................... 711/4 |
| 2004/0186858 | A1 * | 9/2004 | McGovern et al. .......... 707/200 |
| 2005/0097260 | A1 * | 5/2005 | McGovern et al. .......... 711/100 |
| 2006/0123232 | A1 * | 6/2006 | Cannon et al. .............. 713/165 |
| 2007/0022259 | A1 * | 1/2007 | Kitamura et al. ............ 711/152 |

OTHER PUBLICATIONS

Bob Spurzem, "Backup and Disaster Recovery: The benefits of WORM disk." Jul. 1, 2003, pp. 1-6.*
Chris Lueth, TR3263. "WORM Storage on Magnetic Disk Using SnapLock Compliance and SnapLock Enterprise." Network Appliance, Inc. Aug. 2004, pp. 1-13.*

* cited by examiner

*Primary Examiner*—Pierre-Michel Bataille
*Assistant Examiner*—Matthew R Chrzanowski
(74) *Attorney, Agent, or Firm*—Sughrue Mion, PLLC

(57) ABSTRACT

A method for write protection in a storage system using both the "file-level WORM function" and the "block-level WORM function". The block-level WORM function has two modes: the first mode is to prohibit both file access and block access, and the second mode is to prohibit block access only. When a user uses the file-level WORM function to prohibit write access to a file in a volume, a file access invokes the first mode of the block-level WORM function to prohibit write access to the volume where the write prohibited file resides.

19 Claims, 13 Drawing Sheets

| LDEV | MODE | CONF. | TARGET ID | LUN | PERM. | RETENTION |
|---|---|---|---|---|---|---|
| 0 | 0 | 1 | 10:04:e2:04:48:39 | 0 | 1 | 2008/6/30 23:59 |
|  |  |  | 0 | 1 | 0 | 2008/6/30 23:59 |
| 1 | 1 | 0 | 10:04:e2:04:48:39 | 1 | 0 |  |
| 2 | 2 | 1 | 0 | 0 | 0 | 2008/8/4 23:59 |
| 3 | 1 | 0 | 00:21:a2:31:22:b6 | 0 | 0 |  |
| ⋮ | ⋮ | ⋮ | ⋮ | ⋮ | ⋮ | ⋮ |
| 100 | 1 | 1 | 0 |  | k | 1 | 2008/6/30 23:59 |

FIG. 5

| T_ID | LUN | DEV_FILE | FILESYSTEM | PERM1 | PERM2 | RETENTION1 | RETENTION2 |
|---|---|---|---|---|---|---|---|
| 0 | 0 | /dev/rdsk/c0t0d0 | /usr1 | 1 | 12 | 2008/6/30 23:59 | 2008/6/30 23:59 |
| 0 | 1 | /dev/rdsk/c0t0d1 | /usr2 | 0 | 2 |  | 2008/6/30 23:59 |
|  |  |  |  |  |  |  |  |

FIG. 6

WRITE PROTECTION IN A STORAGE SYSTEM ALLOWING BOTH FILE-LEVEL ACCESS AND VOLUME-LEVEL ACCESS

BACKGROUND OF THE INVENTION

1. Field of the Invention

The present invention relates to the storage system for archiving, and more specifically to the Network Attached Storage (NAS).

2. Description of the Related Art

A Write Once and Read Many (WORM) storage is a storage that is not erasable and rewritable, but can be read freely. Currently there are two types of WORM storage systems: the volume-level WORM storage system and the file-level WORM storage system. A volume-level storage system is operative to prohibit write access from host computers to a volume of information that is assembled as a data unit group, such as a block, for a certain period of time. The volume of information may be defined and specified as a logical device. This type of system is often used as a block-level access storage system, like those communicating with hosts using SCSI, FCP-SCSI or iSCSI protocols.

A file-level WORM has a means for prohibiting write access to each file, which may be considered a data unit, for a certain period of time. This type of system is often used as a file-level access storage system, such as a network attached storage (NAS) system, which communicates with hosts using file level access protocols like NFS, CIFS, etc.

Some storage systems allow both the file-level access and the block level access. U.S. Pat. No. 6,779,083 discloses a storage system having a block interface (e.g. Fibre channel) and a file interface (e.g. NFS or CIFS via Ethernet), and allowing access to a volume from both the block interface and the file interface. Even if such a storage system has means for prohibiting write access to one of the files for a certain period of time, the file still may be overwritten from a host connected to the block interface since the volume where the file is stored can also be accessed from the block access interface. One method for preventing write access to the file is to apply a volume-level WORM function to the volume. But when the volume-level WORM is applied, write access to all files are prohibited, including those that users want to have write access.

Therefore, it would be desirable to provide a method for write protection in the system having both a block interface and a file interface.

SUMMARY OF THE INVENTION

In view of the foregoing, it is an object of the present invention to provide a method for more secure data protection.

The storage system of the present invention has at least two methods for processing host accesses: the file access method for processing file-level access from hosts, and the block access method for processing block-level access from hosts. The file access method prohibits write access to a file for a certain period of time (the "file-level WORM function") and the block access method prohibits write access to a block or volume of information for a certain period of time (the "block-level WORM function"). The block-level WORM function has two modes: the first mode is to prohibit both file access and volume access, and the second mode is to prohibit volume access only, thereby permitting file access to other files in the volume.

In the storage system of the present invention, when a user uses the file-level WORM function to prohibit write access to a file in a block or volume, a file access invokes the first mode of the block-level WORM function to prohibit write access to the volume where the write prohibited file resides. Consequently, the files in the volume protected by the file-level WORM function can not be accessed from the block interface adapter, but other files in the volume can still be accessed from the block interface adapter.

BRIEF DESCRIPTION OF THE DRAWINGS

Exemplary embodiments of the present invention are described herein with reference to the accompanying drawings, similar reference numbers being used to indicate functionally similar elements.

FIG. 5 shows an exemplary embodiment of logical device configuration information.

FIG. 6 shows a file system configuration table according to an exemplary embodiment of the present invention.

DETAILED DESCRIPTION OF THE INVENTION

Objects and advantages of the present invention will become apparent from the following detailed description. The following description of illustrative, non-limiting embodiments of the invention discloses specific configurations and components. However, the embodiments are merely examples of the present invention, and thus the specific features described below are merely used to describe such embodiments to provide an overall understanding of the present invention. One skilled in the art readily recognizes that the present invention is not limited to the specific embodiments described below. Furthermore, certain descriptions of various configurations and components of the present invention that are known to one skilled in the art are omitted for the sake of clarity and brevity.

The following is the definitions of WORM related terms:

A "WORM state" means that the files (e.g., data units) or the corresponding logical devices cannot be overwritten or deleted by users for a period of time.

A "WORM state file" refers to the file or data unit that cannot be overwritten or deleted by users for a period of time.

A "WORM state volume" is a logical volume or data unit group in the WORM state.

A "retention period" is one of the attributes of a WORM state file and WORM state volume. A WORM state file or WORM state volume cannot be overwritten or deleted until the time indicated by the retention period is passed or expires.

A "WORM state filesystem" is a file system in which all files and directories therein cannot be overwritten or deleted by users. In other words, the file system is in the WORM state. When one filesystem is stored in a single logical device, the meaning of the WORM state filesystem is substantially the same as the meaning of the WORM state volume, as would be understood by one skilled in the art.

Figure 1:
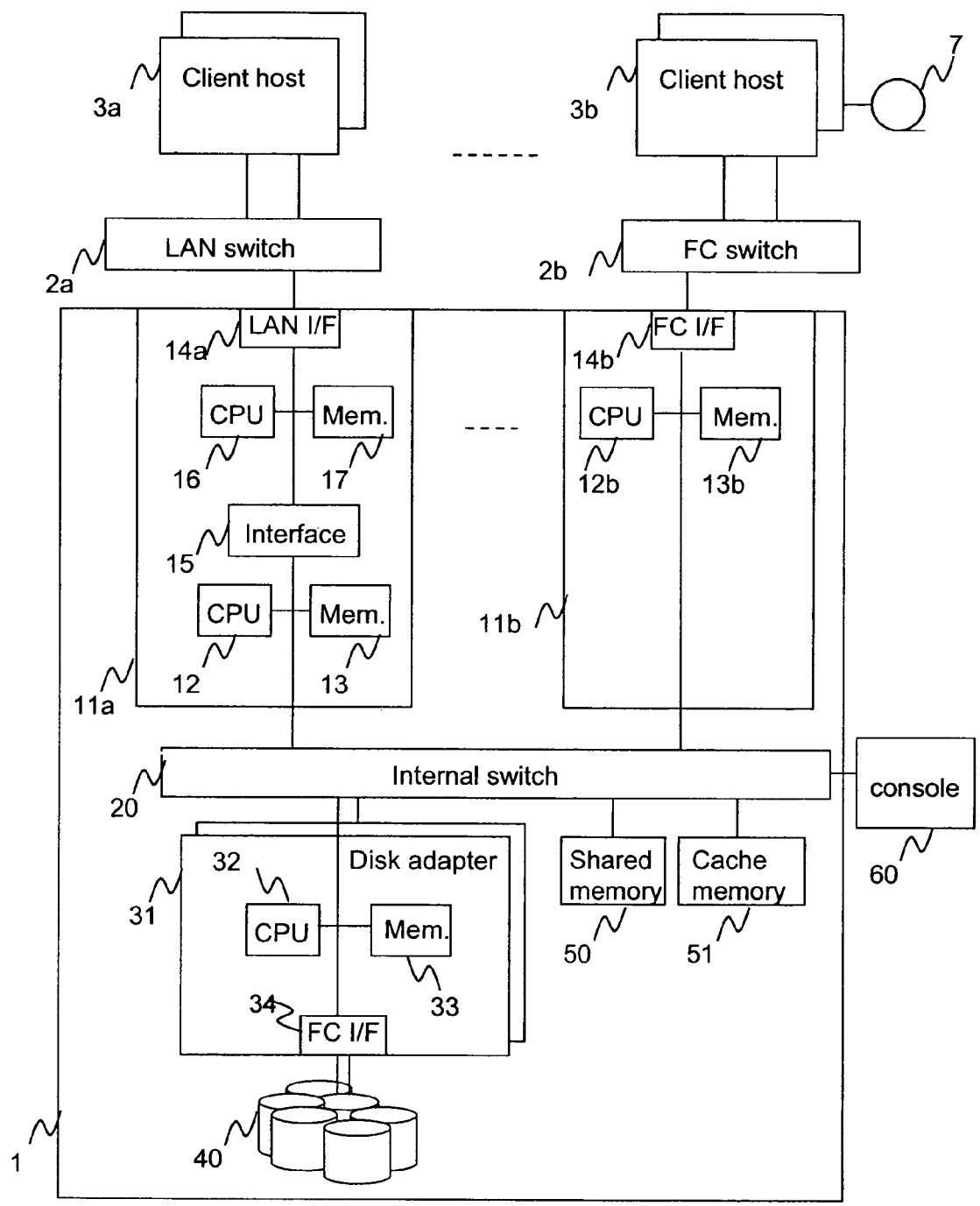
FIG. 1 shows an embodiment of a storage system in which the present invention can be used.
Figure 2:
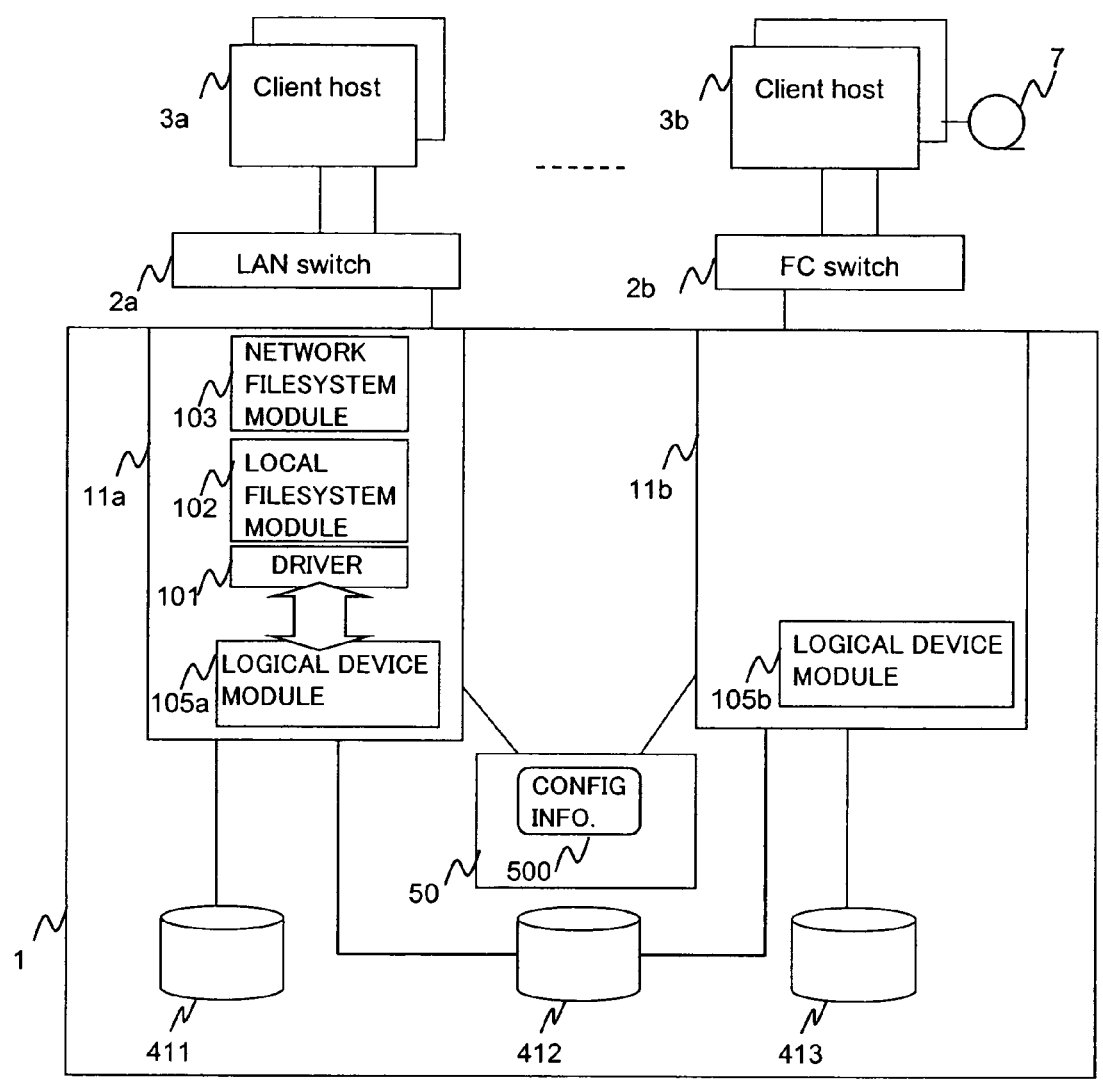
FIG. 2 shows the logical structure of a storage system according to an exemplary embodiment of the present invention.

FIG. 1 illustrates an exemplary and non-limiting embodiment of a storage system 1 in which the present invention can be implemented and used. The illustrated storage system 1 is coupled to one or more client host computers 3a, 3b, which hereinafter are also referred to as "hosts." The storage system 1 is preferably arranged to have a universal applicability to client-host computers 3a, 3b for both block and file-level communication. In the exemplary illustration, the host computers 3a are interfaced to a local area network (LAN) via a LAN switch 2a, and the client host computers 3b are interfaced to a fiber channel (FC) via a FC switch 2b. The client-host computer in the fiber channel arrangement is commonly coupled to a back up tape device 7, as illustrated in FIGS. 1 and 2. Where the storage system is adapted to couple to client host computers through one or both of a LAN and a FC, a corresponding file interface adapter 11a, which may be coupled to a LAN, and FC or the like, and a block interface adapter 11b, which may be coupled to an FC, a LAN or the like, will be used to switchably access storage media, in the form of a disk 40, via a disk adapter 31, or in the form of shared memory 50 or cache memory 51.

The file interface adapter 11a has an interface 14a for communicating with client host computers 3a using a file-level access protocol, e.g., NFS, CIFS, or the like, as would be understood by one skilled in the art. In the illustrated exemplary embodiment, the interface 14a is an Ethernet interface (LAN I/F). Each file interface adapter 11a also has one or more CPUs 12 and 16, one or more corresponding memories 13 and 17, and an interface 15 between the coupled CPU's 12, 16 and respective memories 13, 17. The storage system 1 may have a plurality of file interface adapters 11a.

The block interface adapter 11b has an interface 14b for communicating with client host computers 3b using a block-level access protocol, e.g., SCSI, iSCSI, or the like. In one embodiment, the block interface adapter 11b communicates with the client host computers 3b using the FCP-SCSI protocol, and the interface 14b is a Fiber Channel interface (FC I/F). In another embodiment, the block interface adapter 11b communicates with the client hosts 3b using iSCSI protocol, and the interface 14b is an Ethernet interface. The block interface adapter 11b also includes a CPU 12b and a memory 13b. The storage system 1 may have a plurality of block interface adapters 11b. Hereinafter, both the file interface adapter 11a and the block interface adapter 11b are referred to as "host adapters".

The storage media, in the form of a disk 40, shared memory 50 and/or cache memory 51 provides the file and/or block storage for the WORM-based data. A disk adapter 31 is operative to create one or more logical devices from a plurality of disks 40, and comprises a CPU 32, a memory 33, and a Fiber Channel interface (FC I/F) 34. The storage system 1 may have a plurality of disk adapters 31. The shared memory 50 is used by the file interface adapter 11a, the block interface adapter 11b, and the disk adapter 31 to effect communication with each other. The cache memory 51 is used to store the read data from disks 40, or to store the write data from client hosts 3a or 3b to accelerate read/write accesses.

An internal switch 20, which may be a common switch or separate switches, serves to connect each of the file interface adapters 11a, 11b, to the storage media. In addition, console 60 is attached to the storage system 1 via switch 20 to issue instructions to the storage system 1, to define logical devices, to administer and maintain the storage system 1, or for other purposes, as would be known to one skilled in the art.

FIG. 2 shows the logical structure of a storage system according to an exemplary embodiment of the present invention.

As shown, the file interface adapters 11a are implemented in software and include a network filesystem module 103, a local filesystem module 102, a device driver 101 and a logical device module 105a. The file interface adapters 11a may be coupled to logical storage devices, such as dedicated device 411 and shared device 412.

The network filesystem module 103 is used to communicate with the client host(s) 3a using an appropriate protocol, such as the NFS or CIFS protocol. For example, it may receive a file access request in accordance with the NFS or CIFS protocol, and communicate with the local filesystem module 102 to access the file systems created in the logical devices, such as dedicated device 411 or shared device 412.

The local filesystem module 102 creates the file system in the logical devices, such as dedicated device 411 and shared device 412, receives file access requests from the network filesystem module 103, and responds to the file access requests. To access logical devices, the local filesystem module 102 issues access requests to the device driver 101. The local filesystem module 102 is also operative to prohibit write access to a user-specified file for a certain period of time. Users of client hosts 3a can specify the file to which-the user wants to prohibit write access and the period for write prohibition by using Application Programming Interfaces (APIs).

The device driver 101 converts an access request from the local filesystem module 102 and accesses logical devices via the hardware interface 15, of the type illustrated in FIG. 1. The access protocol used in the device driver 101 corresponds to that used in the interface 15. If the interface 15 is a Fiber Channel interface, the Fiber Channel protocol is used in the device driver 101 as well. If the interface 15 is a proprietary interface of the vendor of the storage system 1, the proprietary protocol is used in the device driver 101 accordingly. In yet another exemplary embodiment, the protocol is a proprietary protocol that enhances the SCSI protocol.

In one exemplary embodiment, modules 101, 102 and 103 comprise software stored in memory, such as the memory 17 of FIG. 1. A skilled artisan would appreciate that the modules could also be implemented by hardware or firmware.

The logical device module 105a in FIG. 2 receives access requests from the device driver 101 via a hardware interface 15, then issues requests to access the logical devices, such as dedicated device 411, shared device 412, and dedicated device 413. The issued access requests are once stored in the shared memory 50. When the disk adapter 31 detects requests in the shared memory 50, it retrieves the requests from the shared memory 50 and processes the requests.

The logical device module 105a and 105b also is operative to prohibit write access to the user specified logical volumes for a certain period of time. Users can specify the logical volume for which they want to prohibit write access from client hosts 3a or 3b via a Graphical User Interface (GUI), from the console 60 via a Command Line Interface (CLI), from client hosts 3b via APIs, or by the instructions from the interface adapter 11a.

In one exemplary embodiment, the logical device module 105a is a software program stored in the memory 13 and is executed by the CPU 12 in FIG. 1. A skilled artisan would appreciate that the logical device module 105a could also be implemented by hardware or firmware.

A logical device module 105b in the block interface adapter 11b is similar to the logical device module 105a. The one difference is that the logical device module 105a receives I/O requests from the device driver 101 and the logical device module 105b receives I/O requests from client hosts 3b.

In one embodiment, the logical device module 105b is a software program stored in the memory 13b and is executed by the CPU 12b in FIG. 1. A skilled artisan would appreciate that the module 105b could also be implemented by hardware or firmware.

In the exemplary embodiment illustrated in FIG. 2, the device driver 101, the local filesystem module 102 and the network filesystem module 103 are executed in the CPU 16 of FIG. 1, and the logical device module 105a is executed in another CPU 12. A skilled artisan would appreciate that, as an alternative, the logical device module 105a, the device driver 101, the local filesystem module 102 and the network filesystem module 103 can be executed in the same CPU.

Figure 3:
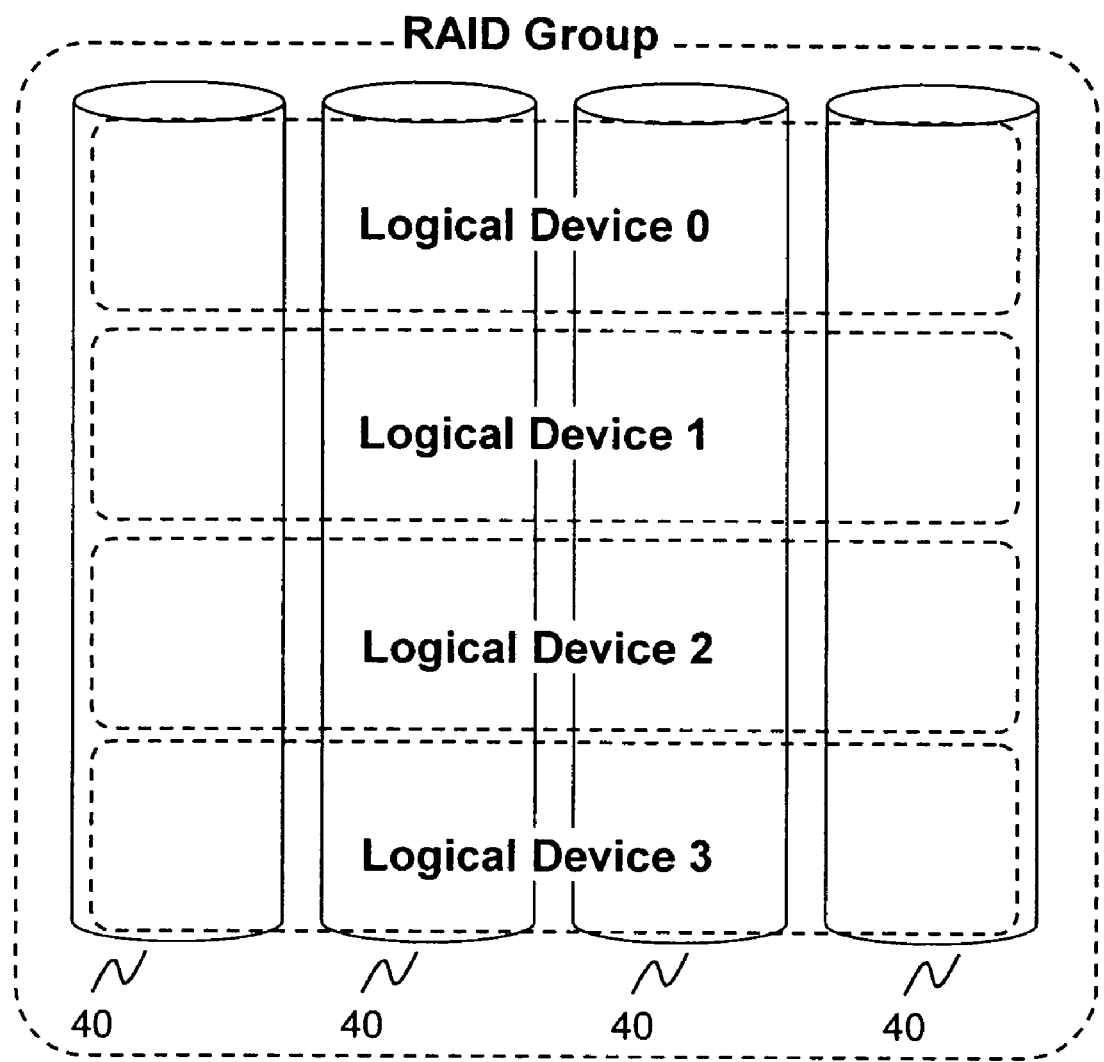
FIG. 3 shows an example of the relation between logical devices and disks.

The disk adapter 31 in FIG. 1 creates one or more logical devices from a plurality of disks 40. The operation of the disk adapter 31 is well known and the description thereof is omitted. An example of the relation between logical devices 0-3 and disks 40 is presented in FIG. 3. The storage system 1 constructs a RAID (Redundant Arrays of Inexpensive Disks) from a plurality of disks 40, and creates logical devices 0-3. Each logical device has its unique identification number called logical device number. As shown in FIG. 3, logical devices whose logical device numbers are 0, 1, 2, and 3 are created in the RAID group.

Figure 4:
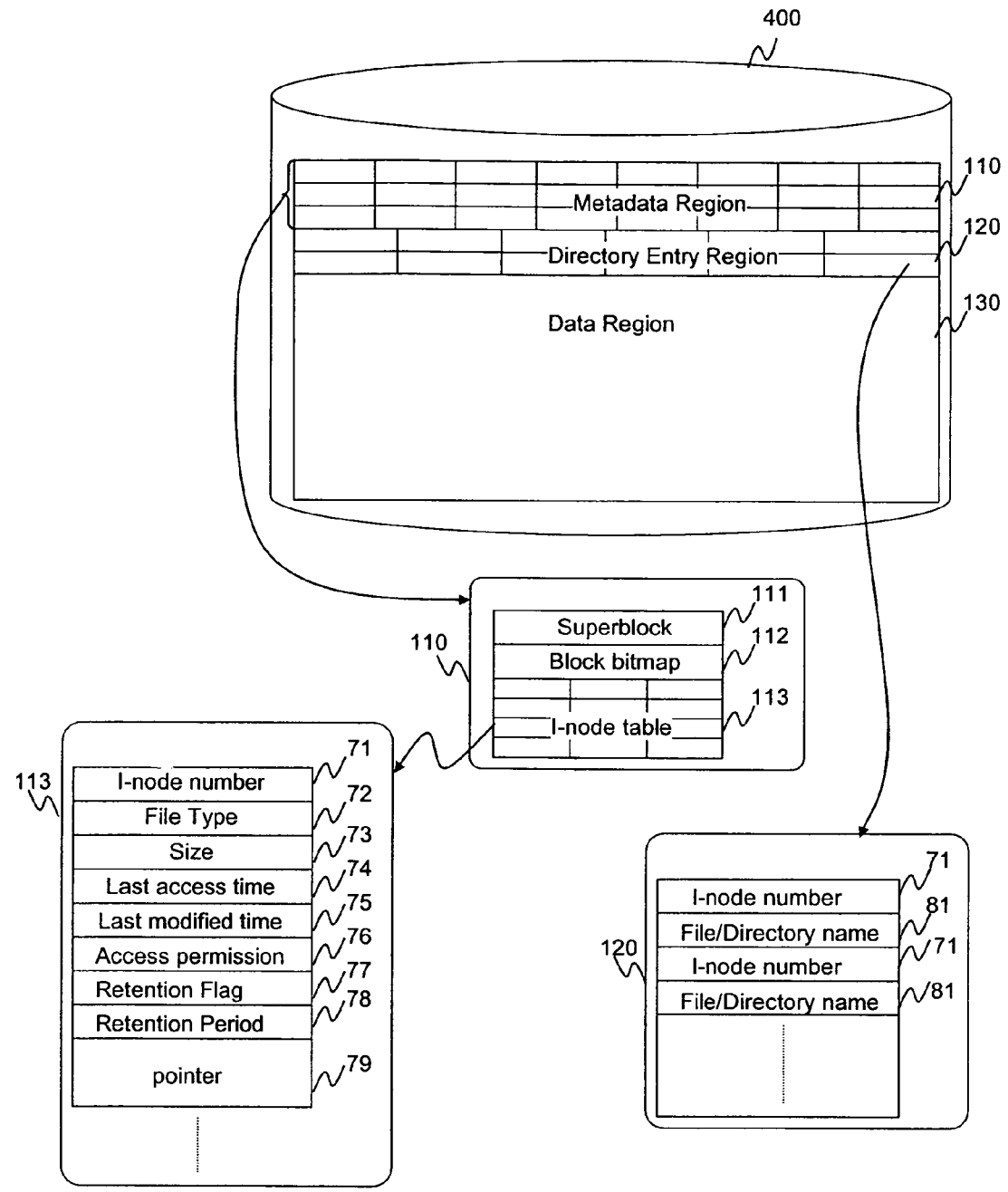
FIG. 4 shows a file system according to an exemplary embodiment of the present application.

The local filesystem module 102 creates a data structure, or file system, in a logical device to store files. FIG. 4 shows a file system 400 according to one exemplary embodiment of the present application. As shown, there are three kinds of regions in the file system 400: a metadata region 110, a directory entry region 120, and a data region 130. The directory entry region 120 is used to store directory name or file name information. Data of each file is stored in the data region 130.

The metadata region 110 is a set of attribute information of each file, which comprises a superblock 111, a block bitmap 112 and i-node tables 113. Each i-node table includes elements 71 through 79. The i-node number 71 is a unique number assigned to a particular node in storage that contains a file, and the file type 72 and size 73 identify relevant information about the file. Last access time 74 and last modified time 75 provide relevant historical information about the file, and are used for a variety of administrative tasks, as would be known in the art. As subsequently explained, an access permission parameter 76 indicates whether write access to the file is permitted in general. Also among these elements, a retention flag 77 and a retention period 78 are used to store the file attributes related to the WORM state. The retention flag 77 is used to indicate whether the file associated with the i-node is in the WORM state, and the retention period value 78 is used to identify the related retention period. The combination of the retention flag 77 and the retention period parameter 78 defines whether a file cannot be overwritten or deleted by anyone before the retention period 78 expires. A pointer 79 directs further access to another specified storage location.

Conventional file systems have access permission information 76, which indicates whether the file can be written and is called the write permission bit. The difference between the write permission bit and the retention flag 77 is that the write permission bit can be changed by the owner of the file whenever desired, but no one can change the retention flag 77 until the retention period 78 expires.

Device access to the information stored in a file system 400, for example, is initiated by an I/O request issued by a driver device 101 in the case of a file access by client host 3a, and by client host 3b directly in the case of a block access. Each I/O request issued by the client host 3b or the driver device 101 includes the identification information of the logical device and the location information in the logical device where the client host 3b or the driver device 101 wants to access. In FCP-SCSI used by the client host 3b, a World Wide Name (WWN) is used as the identification information, and Logical Block Address (LBA) is used as the location information. The driver device 101 in the file interface adapter 11a uses a Target ID (T_ID) and LBA for the device identification information and location information, respectively.

FIG. 5 illustrates logical device configuration information 500, which is stored in the shared memory 50 in FIG. 1. The information 500 is illustrated in column form for convenient reference, but as understood by one skilled in the art, other arrangements also may be used. In FIG. 5, the logical device number of the corresponding logical device, for example as illustrated in FIG. 3, is stored in the column LDEV 501. In the column for the mode of the logical device, MODE 502, each logical device has a mode 0, 1 or 2. In mode 0, write accesses to the logical device from both the file interface adapter 11a and the block interface adapter 11b are allowed. In mode 1, write accesses to the logical device from only the block interface adapter 11b are allowed. In mode 2, write accesses to the logical device from only the file interface adapter 11a are allowed.

In the column for configuration information, CONF 503, each logical device has a value 0 or 1. When the value is 1, the storage system 1 does not allow users to access certain changes of the configuration of the logical device. When the value is 0, user access is permitted.

In the column TARGET ID 504, the device identification information WWN or T_ID is stored. When the value of MODE 502 is 1, write accesses from only the block interface adapter 11b are allowed and the WWN is stored. When the value of MODE 502 is 2, write accesses from only the file interface adapter 11a are allowed and T_ID is stored. When the value of MODE 502 is 0, like LDEV 0, since write accesses to the logical device from both the file interface adapter 11a and the block interface adapter 11b are allowed, both WWN and T_ID are stored. The client hosts 3b access the logical device using WWN, and the client hosts 3a access the logical device via the device driver 101 using T_ID.

A logical unit number is stored for each logical device in the column LUN 505. When client hosts 3b or 3a access the logical device, LUN is specified in addition to WWN or T_ID.

Either 0 or 1 is stored in the access permission column, PERM 506. When the value is 0, the write access to the logical volume is not prohibited. When the value is 1, the write access to the logical device is prohibited until the time that is specified in the column RETENTION 507. As discussed above, when the value in the column PERM 506 is 1, the file is in the WORM state.

Information in the column RETENTION 507 indicate the period when the logical device is not allowed to be written. Until the time specified in the column RETENTION 507 is reached, the logical device module 105a or 105b does not allow write access to the logical volume from client hosts 3a or 3b. As mentioned above, the time shown in the column RETENTION 507 is called the retention period. Rather than a specified date and time, the retention period may be identified as a specific time duration, or other measure of time, as would be understood by one skilled in the art.

When the value in the column MODE 502 is 0 or 2 (write accesses to the logical device from the file interface adapter 11a are allowed) and the value in the configuration column CONF 503 is 1, the value in the column RETENTION 507 is set, even if the value in the column PERM 506 is 0. In this status, the latest retention periods of all the WORM state files are stored.

FIG. 6 shows the file system configuration table 600 that is used by the local filesystem module 102 and the driver device 101 according to one exemplary embodiment of the present invention.

The file system configuration table 600 is stored in the memory 17. Columns 601 and 602 are for the TARGET ID T_ID and the logical unit number LUN of the logical device containing the file system.

The column DEV_FILE 603 is for the device filename of the logical device. The local filesystem module 102 uses the device filename to issue an access request to the logical device.

The column FILESYSTEM 604 is for the filesystem name of the file system.

The column PERM1 605 is similar to the column PERM 506 in FIG. 5. Either 0 or 1 is stored in the column. The local filesystem module 102 can set the file state into the WORM state using the retention flag 77. The local filesystem module 102 can also set or change the state of an entire file system to a WORM state, i.e., all files and directories in the file system are prohibited from being updated/deleted. When the value is 1, the local filesystem module 102 prohibits any write access to the file system until the time specified in the column RETENTION1 607. When the value is 0, the local filesystem module 102 allows write access to the file system.

When at least one of the files in the file system is set to the WORM state, the local filesystem module 102 stores a value 1 in the column PERM2 606. When no file is in the WORM state, a value 0 is stored in the column PERM2 606.

The column RETENTION1 607 shows the period when the logical device is not allowed to be written. Until the time specified in the column RETENTION1 607, the local filesystem module 102 does not allow any write access to the file system.

When the value in column PERM2 606 is 1, the latest retention periods of all the WORM state files are stored in the column RETERNTION2 608.

In one embodiment, the values in the column RETENTION1 607 and in the column RETENTION2 608 are set independently. It is possible that the value in the column RETENTION1 607 is earlier than the value in the column RETENTION2 608. In this case, the write access to all files and directories in the file system is prohibited before the retention period that is stored in the column RETENTION1 607. After the retention period that is stored in the RETENTION1 607, the local filesystem module 102 allows updating files in the file system except the files whose retention flag 77 is set and whose retention period 78 is later than current time.

Figure 7:
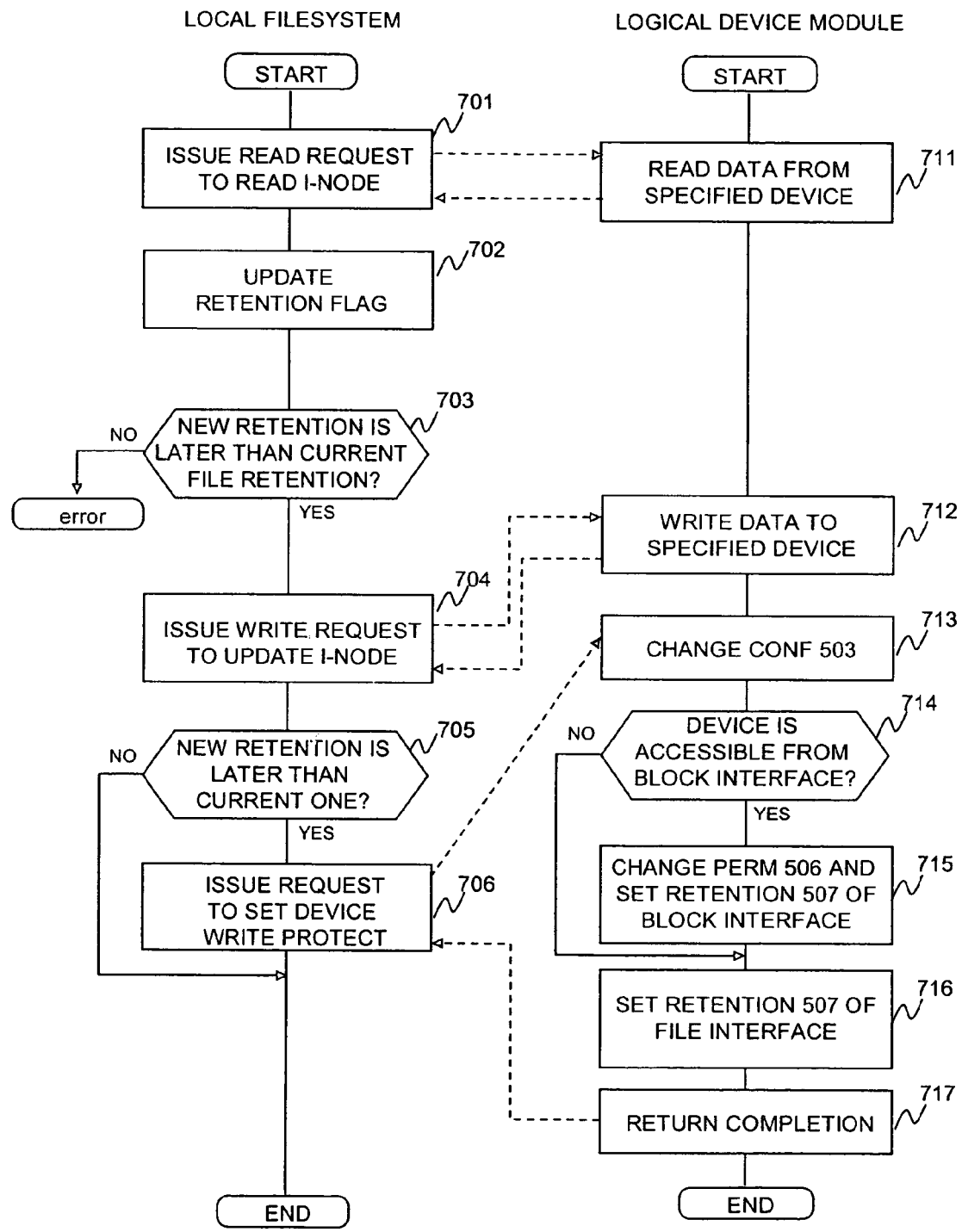
FIG. 7 shows a flowchart of a method for changing the state of a file into the WORM state by a user according to an exemplary embodiment of the present invention.

FIG. 7 shows a flowchart of a method by which a user of the client host 3a can change the state of a file into the WORM state, according to one exemplary embodiment of the present invention. Steps 701 to 706 are carried out by the local filesystem module 102 of the file interface adapter 11a in FIG. 2, and steps 711 to 713 are carried out by the logical device module 105a in that same figure. In the embodiment shown, at first the user issues a request to change the state of a file into the WORM state using an API that is specific to the storage system 1. Alternatively, users can use standard system call that is used by the operating system of the client host 3a.

At step 701, the local filesystem module 102 issues a read request to the logical device module 105a via the driver device 101 to read the i-node of the specified file. If a copy of the i-node exists in the memory 17, the process is not executed. Otherwise, after receiving the data block of i-node from the device driver 101, the process proceeds to step 702.

At step 702, the local filesystem module 102 checks whether the value of the retention flag 77, which is. copied from the logical device to the memory 17, is 1. If yes, the file is already in the WORM state. The process then terminates, returning an error to the user.

If the value of the retention flag 77 is 0, the local filesystem module 102 sets the retention flag field 77 of the specified file to 1 and sets the retention period field 78 of the specified file. At this point, these fields are not reflected to the logical device.

At step 704, the local filesystem module 102 issues a write request with the updated i-node information to update the i-node of the file. After the driver device 101 returns an acknowledgement of the write request, the process proceeds to step 705.

At step 705, it is determined whether the retention period to be set to the specified file by the user is later than the latest retention period currently set in one of the files in the file system. This can be done by comparing the retention period specified by the user with the RETENTION2 608 in the file system configuration table 600. If the retention period specified by the user is not later than the time in RETENTION2 608, the process ends. If the retention period specified by the user is later than the time in the RETENTION2 608, the local filesystem module 102 issues a request to change the mode of the logical device to the WORM state at step 706. As discussed below, the logical device module 105a then performs steps 713-717 to set the mode of the logical device to the WORM state. When the logical device module 105a returns a completion signal, the process ends.

At step 711, when receiving the read request issued by the local filesystem module 102 at step 701, the logical device module 105a reads i-node data from the logical device and returns the i-node data to the local filesystem module 102. The location information of the i-node is sent from the local filesystem module 102 with the read request, which includes T_ID, LUN, and LBA.

At step 712, when receiving the write request issued by the local filesystem module 102 at step 704, the logical device module 105a writes data to the logical device specified by the user.

From step 713 to step 717, the logical device module 105a sets the mode of the logical device to the WORM state when it receives the request from the local filesystem module 102. The request contains the retention period. In one embodiment, the format of the request is a proprietary format. Alternatively, the format may be the enhanced format of the MODE SELECT command in the SCSI protocol.

At step 713, the logical device module 105a receives the request issued by the local filesystem module 102 at step 706 to set the mode of the logical device to the WORM state, and changes the value of the CONF 503 in the corresponding logical device to 1.

At step 714, the logical device module 105a checks if the specified logical device is accessible from both the block interface adapter 11b and the file interface adapter 11a. The check can be carried out by examining the corresponding row of the logical device configuration information 500. If the logical device is accessible from both host adapters, two sets of TARGET ID 504 and LUN 505 are defined in the logical device. For example, in the first row (the element 508 in FIG. 5), two sets of TARGET ID 504 and LUN 505 are defined in LDEV zero. If the logical device is accessible from both host adapters, the process proceeds to step 715. Otherwise, the process proceeds to step 716.

At step 715, the logical device module 105a changes the value of the field PERM 506 in the corresponding logical device into 1, and puts the retention period in the field RETENTION 507. Only the field of PERM 506 and RETENTION 507 that are used for the block interface adapter 11b (e.g., the row where WWN is set in the TARGET ID 504 field) are updated. When the PERM 506 and the RETENTION 507 fields are already set, i.e., when one or more files in the logical device have already been set to the WORM state, the process compares the retention period currently set in the RETENTION 507 field with the new retention period received at step 713, and updates the RETENTION 507 field if the new retention period is later than the current retention period. If the new retention period is earlier than the current retention period in the RETENTION 507, the value of the RETENTION 507 is not updated.

At step 716, the logical device module 105a sets the RETENTION 507 of the file interface. Again, if the retention period received from the local filesystem module 102 is not later than the current RETENTION 507, the RETENTION 507 field is not updated.

At step 717, a completion signal is returned to the local filesystem module 102, advising that the change in has been accomplished.

Figure 8:
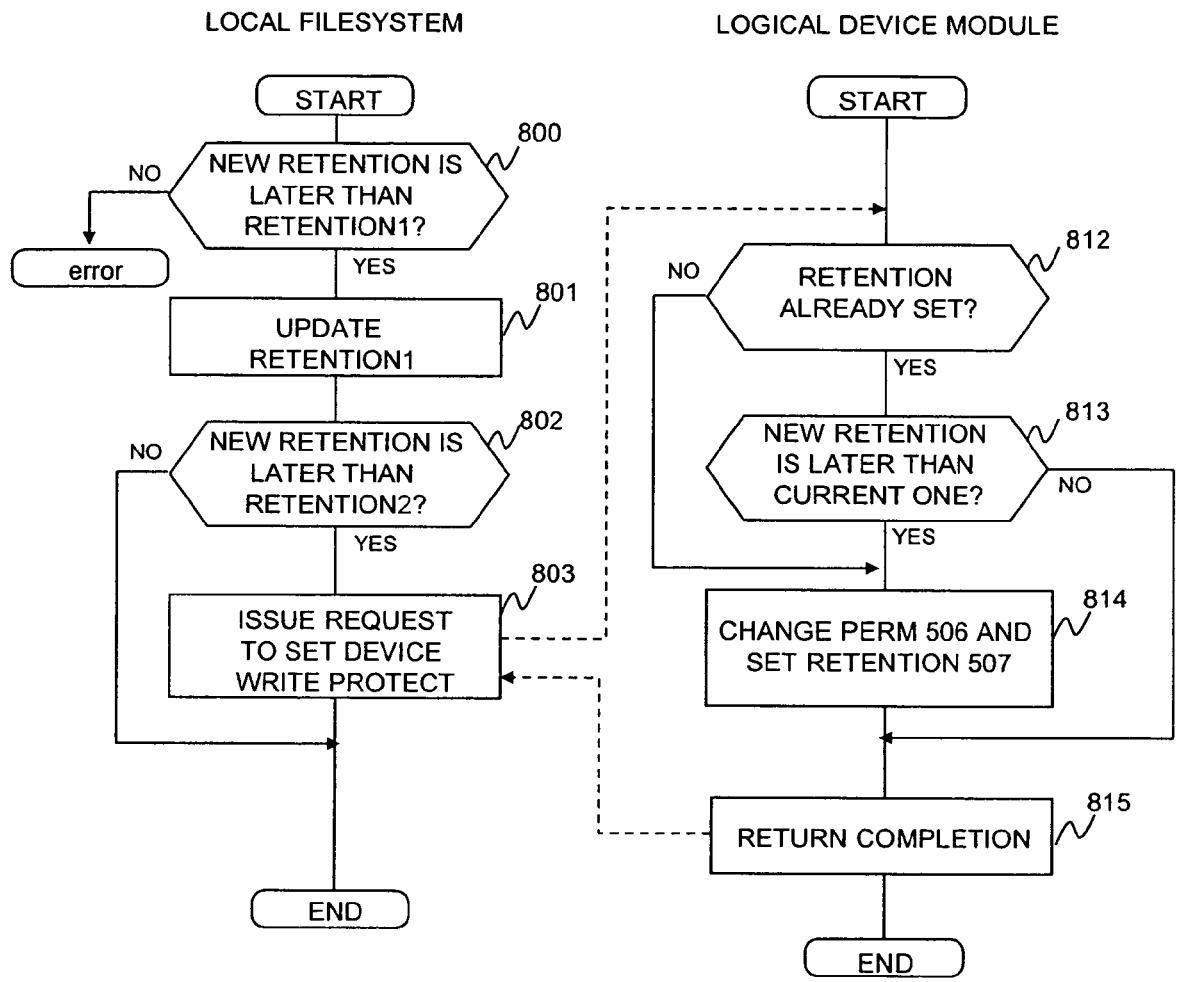
FIG. 8 shows a flowchart of a method for changing the state of the filesystem, or logical volume, into the WORM state by a user according to an exemplary embodiment of the present invention.

FIG. 8 shows a flowchart of a method by which a user of the client host 3a can change the state of the filesystem, or logical volume, into the WORM state, according to one exemplary embodiment of the present invention. Steps 800 to 801 are carried out by the local filesystem module 102 in the file interface adapter 11a of FIG. 2, and steps 812 to 815 are carried out by the logical device module 105a in that same Figure. Similar to the method shown in FIG. 7, the user can issue a request to change the state of a filesystem into the WORM state using an API that is specific to the storage system 1. Alternatively, the user can use the standard system call by the operating system of the client host 3a.

At step 800, the local filesystem module 102 compares the new retention period received from the user and the RETENTION1 607 and RETENTION2 608 that are then currently stored in the file system configuration table 600 in FIG. 6. If the newly received retention period is later than the RETENTION1 607 and the RETENTION2 608, the process proceeds to step 801. Otherwise, the process terminates.

At step 801, the local filesystem module 102 issues a request to change the mode of the logical device to the WORM state. As discussed below, the logical device module 105a then performs steps 812-815 to set the mode of the logical device to the WORM state. When a completion signal is returned from the logical device module 105a to the local filesystem module 102, the process ends.

At step 812, the logical device module 105a checks the logical device configuration information 500 and decides whether the retention period is already set in the specified logical device. If it is set, the process proceeds to step 813. Otherwise, the process proceeds to step 814.

At step 813, it is determined whether the retention period newly received from the local filesystem module 102 is later than the retention period currently set in the RETENTION 507 field in the corresponding logical device. If so, the process proceeds to step 814. Otherwise, the process proceeds to step 815. At step 814, the logical device module 105a. sets the PERM 506 field in the logical device to 1, and sets the retention time into the RETENTION 507 field. At step 815, a completion signal is returned to the local filesystem module 102.

Figure 9:
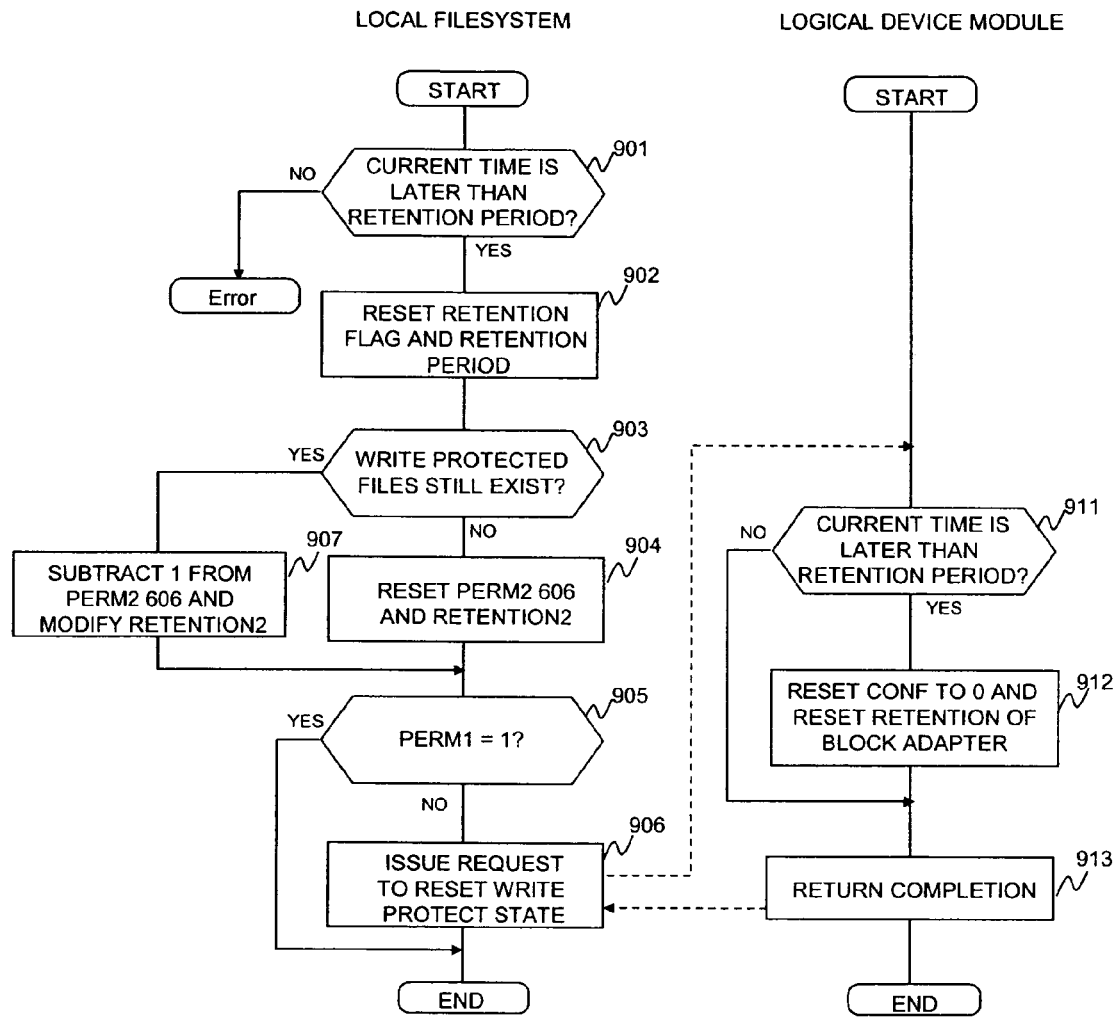
FIG. 9 shows a flowchart of a method for resetting the WORM state of a file in response to a request from a user according to an exemplary embodiment of the present invention.

FIG. 9 shows a flowchart of a method for resetting the WORM state of a file in response to a request from a user of client hosts 3a, according to an exemplary embodiment of the present invention.

At step 901, the local filesystem module 102 checks as to whether the current time is later than the retention period 78 of the designated file. If the current time is not later than the retention period 78, the process terminates. Otherwise, the process proceeds to step 902.

At step 902, the local filesystem module 102 resets the retention flag 77 and the retention period 78 of the file according to the user's request.

At step 903, the local filesystem module 102 checks if there are still other WORM state files in the file system. If other WORM state files exist, the process skips to step 905. Otherwise, the process proceeds to step 904.

At step 904, the local filesystem module 102 resets PERM2 606 and RETENTION2 608 in the file system configuration table 600.

At step 905, the local filesystem module 102 checks if the file system is in WORM state, i.e., whether the PERM1 605 in the file system configuration table 600 is 1. If yes, since the process does not need to change the state of the logical volume at this point, the process ends. Otherwise, the process proceeds to step 906.

At step 906, the local filesystem module 102 issues a request to the logical device module 105a to reset the mode of the logical device. As discussed below, the logical device module 105a resets the mode of the logical device at steps 911 and 912. When the completion signal is returned from the logical device module 105a to the local filesystem module 102, the process ends.

At step 911, the logical device module 105a checks the logical device configuration information 500 to see if the current time is later than the retention period 507 of the designated logical volume. If the current time is not later than the retention period 78, the process skips to step 913. Otherwise, the process proceeds to step 912. At step 912, the logical device module 105a sets the CONF 503 into '0', and the RETENTION PERIOD 507 in the logical device configuration information 500 is deleted. At step 913, the process returns a completion signal to the local filesystem module 102.

Figure 10:
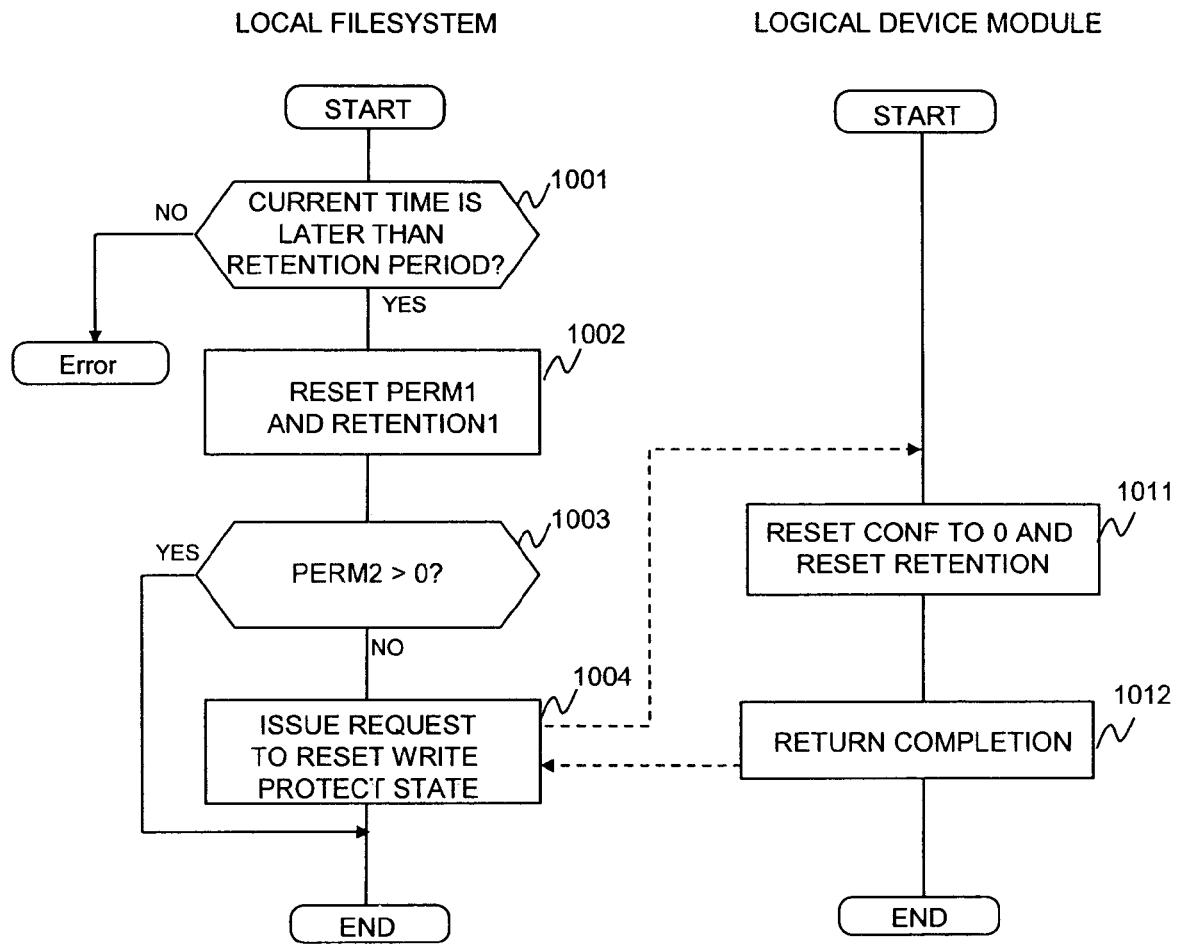
FIG. 10 shows a flowchart of a method for resetting the WORM state of a filesystem (logical volume) in response to a request from a user according to an exemplary embodiment of the present application.

FIG. 10 shows a flowchart of a method for resetting the WORM state of a filesystem (logical volume) in response to a request from a user of client hosts 3a according to an exemplary embodiment of the present application.

At step 1001, the local filesystem module 102 checks if the current time is later than the RETENTION1 607 of the designated file system (logical volume). If the current time is not later than the RETENTION1 607, the process terminates. Otherwise, the process proceeds to step 1002.

At step 1002, the local filesystem module 102 resets PERM1 605 and RETENTION1 607 according to the user's request.

At step 1003, the local filesystem module 102 checks as to whether at least one of the files in the filesystem is still in the WORM state, e.g., by checking if the PERM2 606 in the file system configuration table 600 is still 1. If it is, since the process does not need to change the state of the logical volume at this point, the process ends. Otherwise, the process proceeds to step 1004.

At step 1004, the local filesystem module 102 issues a request to reset the mode of the logical device. As discussed below, the logical device module 105*a* resets the mode of the logical device at step 1011. When the completion signal is returned from the logical device module 105*a* to the local file system 102, this process ends. At step 1011, the logical device module 105*a* sets the CONF 503 into '0', and the RETENTION PERIOD 507 in the logical device configuration information 500 is deleted. At step 1012, the process returns completion signal to the local filesystem module 102.

In one embodiment, the method for changing configuration includes the following steps:
1) making the logical device accessible/inaccessible from host adapters, i.e., device mapping/un-mapping; and
2) prohibiting the write access to the logical device, i.e., set the WORM state.

A skilled artisan would appreciated that other operation such as defining logical devices from disks 40 can also be included.

Figure 11A:
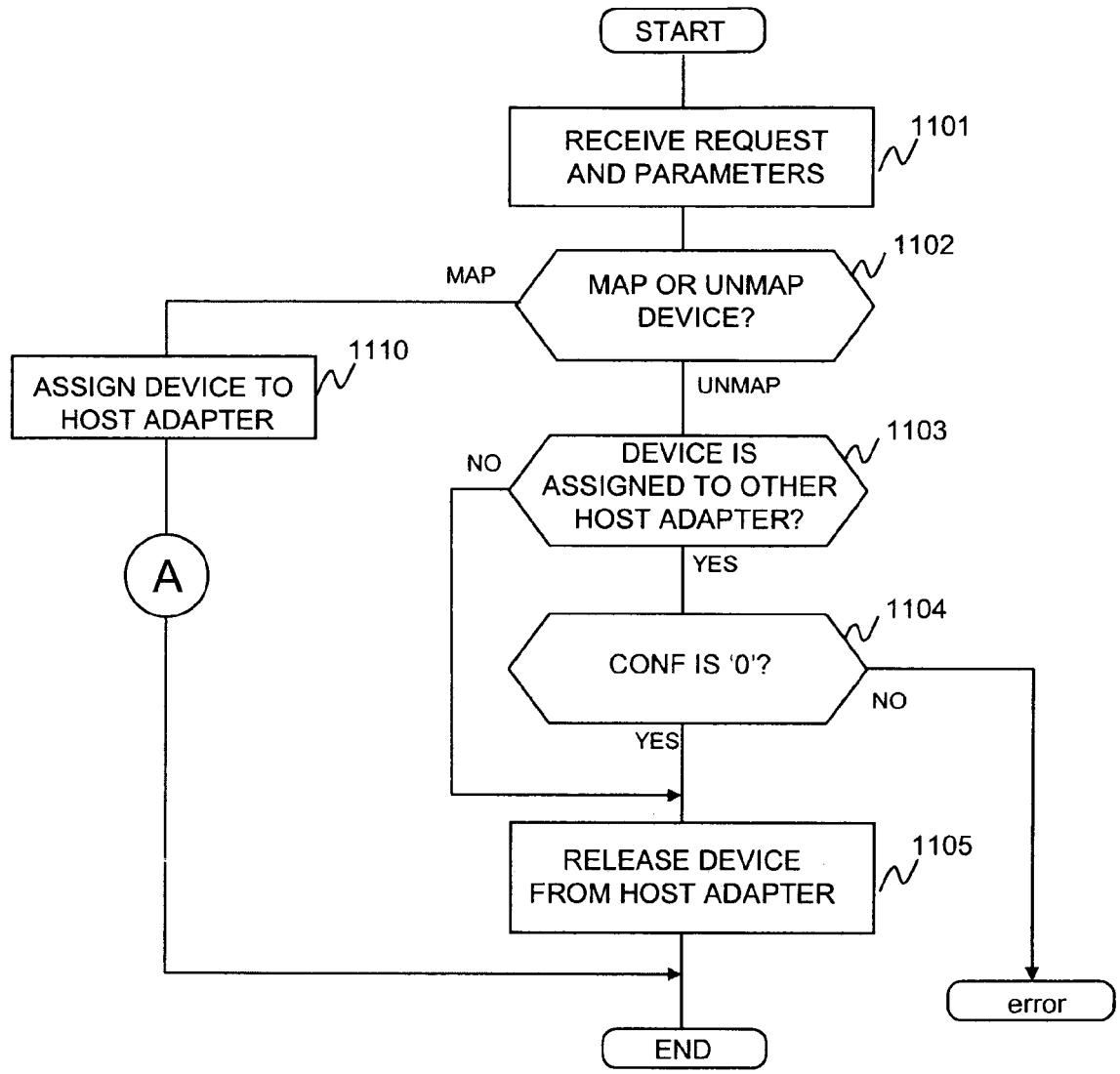
FIGS. 11A and 11B show a flowchart for processing a device mapping request by logical device modules according to an exemplary embodiment of the present invention.
Figure 11B:
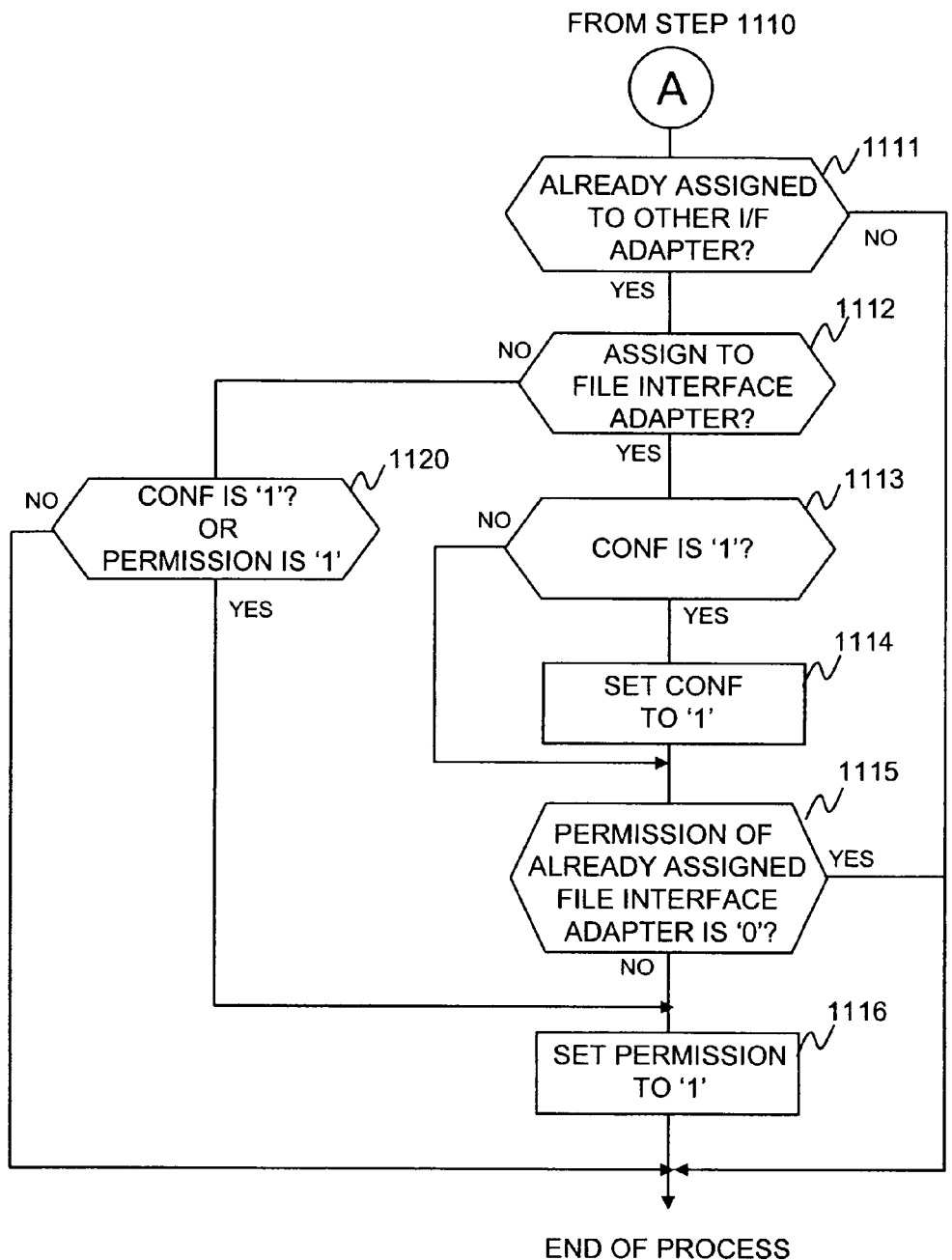

FIGS. 11A and 11B show a flowchart for processing a device mapping request by any of the logical device modules 105*a* or 105*b* according to an exemplary embodiment of the present invention. The device mapping request is issued by the console 60 via GUI or CLI, by client hosts 3*a* via LAN, or by client hosts 3*b* via Fiber Channel using some APIs.

At step 1101, the logical device module 105*a* or 105*b* receives a request and parameters for device mapping/un-mapping. The parameters include:
1) Host adapter information specifying the name of the host adapter, i.e., the file interface adapter 11*a* or the block interface adapter 11*b*, where the logical device is to be mapped or to be un-mapped. When more than one file interface adapter 11*a* or block interface adapter 11*b* exists in the storage system 1, users need to identify the host adapters, e.g., by numerical value.
2) Operation identifiers indicating whether the operation is to map the logical device to a host adapter or to un-map the logical device from a host adapter.
3) The logical device number and LUN of the logical device.

At step 1102, the process checks whether the request is for mapping the logical device to a host adapter or for un-mapping the logical device from a host adapter. If the request is for mapping the logical device, the process proceeds to step 1110. If for unmapping, the process proceeds to step 1103.

At step 1103, the process checks whether the logical device is already assigned to any other host adapter. If yes, the process proceeds to step 1104. Otherwise, the process goes to step 1105.

At step 1104, the process checks if the CONF 503 of the other host adapter is 0. If the value of the CONF 503 is 0, the other host adapter is not in the WORM state, and the process proceeds to step 1105. If the value of the CONF 503 is 1, the other host adapter is in the WORM state, and the process terminates and returns error information to the requester.

At step 1105, the process un-maps the logical device from the specified host adapter. In one embodiment, the process deletes the corresponding entry in the logical device configuration table 500.

At step 1110, the process assigns theological device to the specified host adapter. In one embodiment, the process adds the corresponding entry in the logical device configuration table 500.

From step 1111 to step 1116, the process decides whether the PERM 506 field of the host adapter assigned at step 1110 should be set to 1. The rules are as follows:
1) When a logical device is to be mapped to one of the block interface adapters 11*b*, if the logical device is already mapped to any host adapter and one of the files or the logical device is in the WORM state, the PERM 506 and the RETENTION 507 of the host adapter assigned at step 1110 should be set. The rules area as follows:
2) When a logical device is to be mapped to one of the file interface adapters 11*a*, if the logical device is already mapped to one or more block interface adapters 11*b*, but is not mapped to any file interface adapters 11*a*, the PERM 506 and the RETENTION 507 field of the host adapter assigned at step 1110 should be set to the same value as the one that is already set in the row of the block interface adapters 11*b*; and if the logical device is already mapped to one or more block interface adapters 11*b*, and is also mapped to one or more file interface adapters 11*a*, the PERM 506 and the RETENTION 507 field of the host adapter assigned at step 1110 should be set to the same value as the one that is already set in the row of file interface adapters 11*a*.

Specifically, at step 1111, the process checks if the logical device is already assigned to host adapters other than the one assigned at step 1110. If yes, the process proceeds to step 1112. Otherwise, the process ends.

At step 1112, the process checks if the assigning request is to assign the logical device to the file interface adapter 11*a* or to the block interface adapter 11*b*. If the request is to assign the logical device to the file interface adapter 11*a*, the process proceeds to step 1113. Otherwise, the process proceeds to step 1120.

At step 1120, it is decided whether the CONF 503 of the logical device is 1or if the PERM 506 of the host adapters found already assigned to the logical device at step 1111 is 1. If yes, the process proceeds to step 1116. Otherwise, the process ends.

At step 1113, the process checks if the CONF 503 field of the logical device is 1. If it is 1, the process proceeds to step 1115. Otherwise, the process proceeds to step 1114.

At step 1114, the process sets the CONF 503 of the host adapter to 1.

At step 1115, the process checks if the PERM 506 of the file interface adapter found already assigned at step 1111 is 0. If it is 0, the process ends. Otherwise, the process proceeds to step 1116.

At step 1116, the PERM 506 of the host adapter assigned at step 1110 is set.

In addition, according to the rules mentioned above, if the logical device is already mapped to one or more block interface adapters 11*b*, but is not mapped to any file interface adapters 11*a*, the RETENTION 507 field of the host adapter assigned at step 1110 is set at step 1116 to the same value as that of the block interface adapters 11*b*. If the logical device is already mapped to one or more block interface adapters 11*b*, and is also mapped to one or more file interface adapters 11*a*, the RETENTION 507 field of the host adapter assigned at step 1110 is set at step 1116 to the same value as that of file interface adapters 11*a*.

This invention is used for information systems accommodating a plurality of different kinds of host access methods, such as file access and block access, and which is used for archiving data securely. When two kinds of host access methods are allowed, the volume that is used by NAS accessed via the file interface adapter 11*a* can be shared by the client hosts 3*b* via Fiber Channel SAN and the data in the volume can be backed up via Fiber Channel SAN to a tape device 7 (see FIG. 1). This contributes to the workload reduction of the CPU of the file interface adapter 11*a* or client hosts 3*a*, but it has risks that the data in the volume is erroneously or maliciously overwritten from client hosts 3*b*. In this invention, when users set the state of the file or file system via the file interface adapter 11*a* into the WORM state, since the volume where the file or file system reside becomes inaccessible from client hosts 3b via Fiber Channel SAN, the storage system is advantageous in both the workload reduction of file interface adapter 11a (or client hosts 3a, and the data security.

Figure 12:
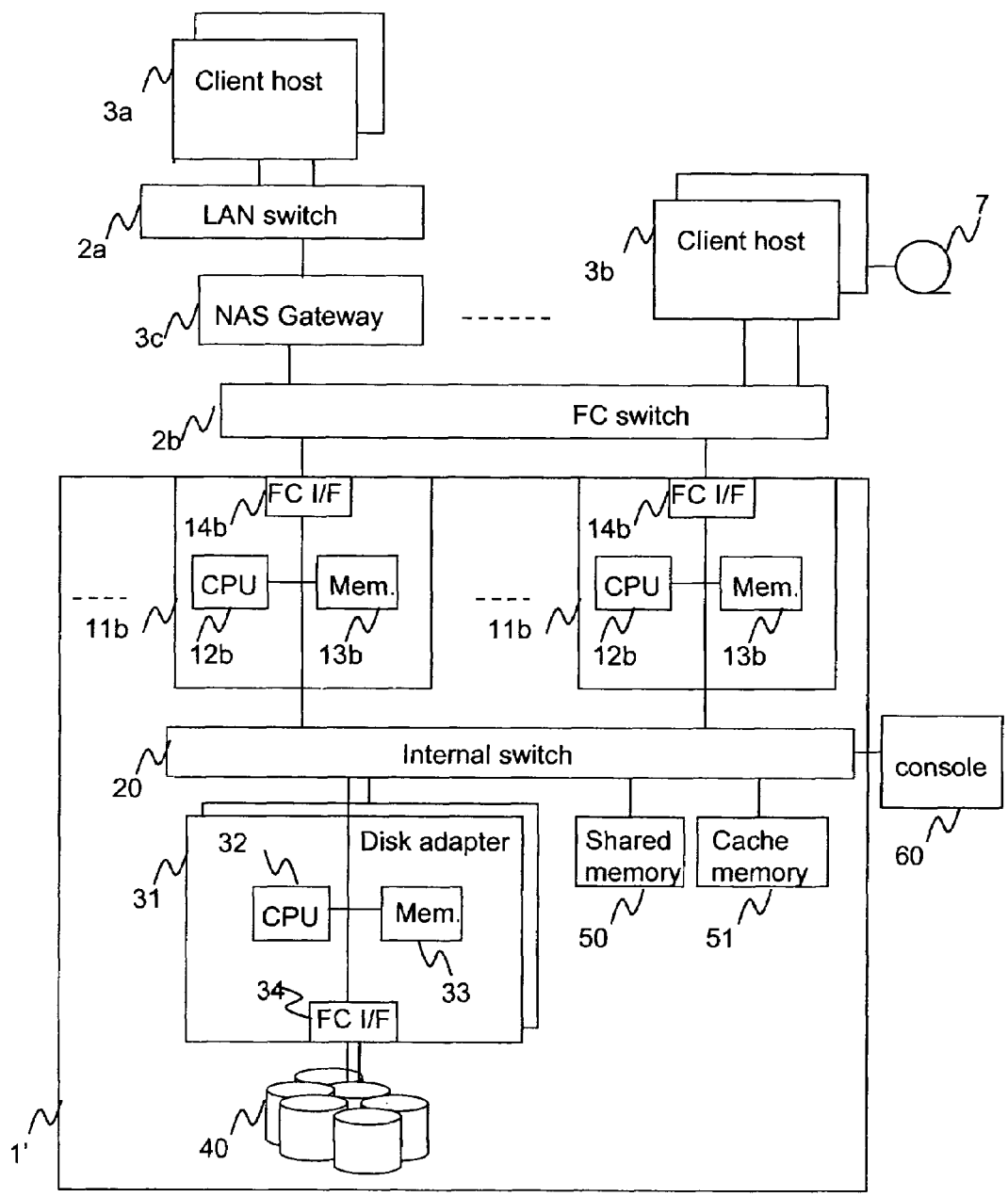
FIG. 12 shows another exemplary embodiment of storage system in which the present invention can be used.

This invention can also be applied to other storage system having a different configuration from the storage system 1 in FIG. 1. For example, the storage system 1 in FIG. 12 does not have file interface adapter, but has a NAS gateway 3c, in which the network filesystem module 103, the local filesystem module 102, and driver 101 reside. This invention can also be applied to the combination of the storage system shown in FIG. 1 and the storage system shown in FIG. 12.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method for providing write protection in a data storage system, said system providing a first type of write access for accessing a first device and a second device in the storage system, and a second type of write access for accessing the second device and a third device, the method comprising:
providing a first type of write protection for prohibiting write access to a data unit stored in the second device;
providing a second type of write protection for prohibiting write access to a data unit group, said second type of write protection including a first mode to prohibit both said first type of write access and said second type of write access, and a second mode to prohibit only said first type of write access against data units in the second device;
determining whether or not a target device is accessible by both the first type of write access and the second type of write access;
invoking the first mode responsive to at least one data unit of the data unit group having an associated indication of unallowable write access if the target device is accessible by both the first type of write access and the second type of write access; and
invoking the second mode if the target device is not accessible by both the first type of write access and the second type of write access,
wherein the data unit group is a block or file system, the data unit is a file, the first type of write access is a block-level access, and the second type of write access is a file-level access.

2. The method according to claim 1, wherein said storage system comprises storage media divisible into logical devices and further comprising, storing logical device configuration information for said data units and said data unit groups, said information indicating at least an accessibility state and a retention period for each data unit and data unit group.

3. The method according to claim 2, further comprising changing at least one of a stored accessibility state and a stored retention period in said logical device configuration information to a new accessibility state and a new retention period, respectively.

4. The method according to claim 3,
wherein the data unit is a data file and the data unit group is a data file group, and
wherein said changing further comprises:
comparing said new retention period for said data file to at least one stored retention period in said logical device configuration information for a data file group containing said data file, and
updating a retention period for said data file if the new retention period is later than the stored retention period for said data file.

5. The method according to claim 4, wherein said updating step is executed if the new retention period is later than the retention period currently set for any data file in a data file group containing said data file.

6. The method according to claim 3, wherein the first type of write protection is a file-level Write Once and Read Many (WORM), and the second type of write protection is a block-level WORM.

7. The method according to claim 6, wherein said changing step comprises changing the accessibility state of a file to a WORM state.

8. The method of claim 6, wherein said changing step comprises changing the accessibility state of a data unit group containing the file to a WORM state.

9. The method according to claim 6, further comprising resetting the write protection state of the data unit group containing the file to exit the WORM state when the group has no file in the WORM state.

10. The method according to claim 1, wherein a data unit group has an associated indication of unallowable access and a plurality of data units in said data unit group have respective indications of unallowable access, said method further comprising:
after expiration of a retention period for said data unit group, permitting updating of data units within said data unit group on the basis of the indication of unallowable access for each respective data unit.

11. A storage system for storing information for access by one or more client host devices in data storage media, said system comprising:
a physical interface operable to facilitate the access by the one or more client host devices;
target devices including:
a first dedicated device being accessible by a file write access only;
a second shared device being accessible by both the file write access and a block write access; and
a third dedicated device being accessible by the block write access only;
file access control means for implementing a file-level WORM function to prohibit write access to a file on a target device of said data storage media;
block access control means for implementing a block-level WORM function to prohibit write access to said target device, said block access control means being operative in a first mode to prohibit write access to said target device as a block and to prohibit write access to said target device by said file access control means, and being operative in a second mode to prohibit write access to said target device by only said file access control means; and
a processor for determining whether or not a target device is accessible by both the file access control means and the block access control means;
wherein the first mode is invoked responsive to at least one file in said target device being a write prohibited file if the target device is accessible by both the file access control means and the block access control means, and
wherein the second mode is invoked if the target device is not accessible by both the file access control means and the block access control means.

12. A storage system as recited in claim 11, wherein said file access control means is operative to invoke said first mode of block access to prohibit write access to the volume where the write prohibited file resides.

13. A storage system as recited in claim 11, further comprising means for changing at least one of a stored accessibility state and a stored retention period in a logical device configuration information to a new accessibility state and a new retention period, respectively.

14. A storage system as recited in claim 13, wherein said means for changing comprises:
   means for comparing said new retention period for said data file to at least one stored retention period in said logical device configuration information for a data file group containing said data file, and
   means for updating a retention period for said data file if the new retention period is later than the stored retention period for said data file.

15. A storage system comprising:
   a plurality of client host devices;
   a data storage having a plurality of target devices forming information volumes for storing a volume of data for access by one or more of said client host devices;
   a first host adapter, coupled between said plurality of client host devices and said data storage, said first host adapter being operative to implement a file-level WORM function to prohibit write access to a file in an information volume of said data storage; and
   a second host adapter, coupled between said plurality of client host devices and said data storage, said second host adapter being operative to implement a block-level WORM function to prohibit write access to an information volume of said data storage,
   wherein said first host adapter is being operative in a first prohibit access mode to prohibit write access to said target device as a block and to prohibit write access to a file in said target device, and being operative in a second prohibit access mode to prohibit write access to files in said target device,
   wherein a processor determines whether or not the target device is accessible by both the first host adapter and the second host adapter,
   wherein the first prohibit access mode is selected when the target device is accessible by both the first host adapter and the second host adapter and at least one file in said target device is set to a write access prohibit state, and
   wherein the second prohibit access mode is selected when the target device is not accessible by both the first host adapter and the second host.

16. The storage system as recited in claim 15, further comprising retention information storage, accessible by said first host adapter and said second host adapter, for storing access and retention period information corresponding to respective data volumes and data files.

17. The storage system as recited in claim 16, wherein said first host adapter comprises a filesystem module operative in communication with said retention information storage to prohibit write access to a user specified file for a specified period of time and a logical device module for prohibiting write access to a user specified logical volume for a specified period of time, and said second host adapter comprises a logical device module for prohibiting write access to a user specified logical volume for a specified period of time.

18. The storage system as recited in claim 16 wherein said file system module is operative, in response to user specified inputs, to change access and retention period information in said retention information storage.

19. A storage medium embodying a computer program product containing program code executable on a computer for performing a method for providing write protection in an information storage system, said system providing a first type of write access for accessing a first device and a second device in the storage system, and a second type of write access for accessing the second device and a third device, the method comprising:
   providing a first type of write protection for prohibiting write access to a data unit stored in the second device;
   providing a second type of write protection for prohibiting write access to a data unit group, said second type of write protection including a first mode to prohibit both said first type of write access and said second type of write access, and a second mode to prohibit only said first type of write access against data units in the second device;
   determining whether or not a target device is accessible by both the first type of write access and the second type of write access;
   invoking the first mode responsive to at least one data unit in the data unit group having an associated indication of unallowable write access if the target device is accessible by both the first type and the second type of write access; and
   invoking the second mode if the target device is not accessible by both the first type of write access and the second type of write access.

* * * * *